June 14, 1927.
G. A. TRAUGER
BINDER HITCH
Filed Sept. 1, 1926
1,632,013
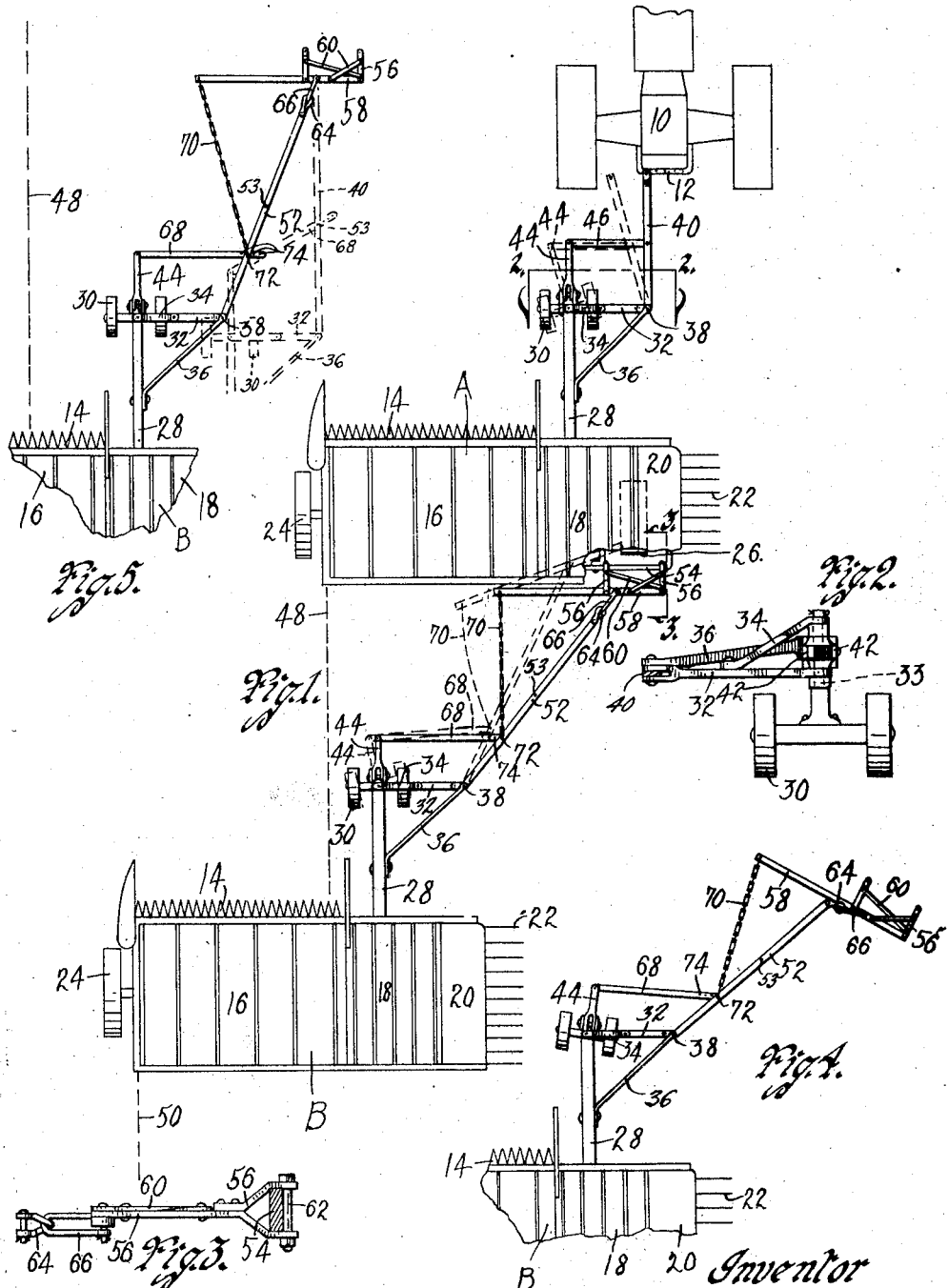

Patented June 14, 1927.

1,632,013

UNITED STATES PATENT OFFICE.

GUY A. TRAUGER, OF LIVERMORE, IOWA.

BINDER HITCH.

Application filed September 1, 1926. Serial No. 132,992.

The object of my invention is to provide a binder hitch of simple, durable and comparatively inexpensive construction.

A further object is to provide a satisfactory hitch of this type for hitching a grain binder to a tractor.

Still a further object is to arrange the hitch so that the tractor is offset from the path of travel of the front wheels of the binder without undue side draft.

Still a further object is to so arrange my hitch that there is no tendency when pulling the binder for the hitch to exert a downward pressure on the front wheels as is the case with the usual type of binder hitch.

Still a further object is to provide my hitch with a frame for hitching one binder behind another so that the second binder can cut a swath of grain next to that cut by the first binder.

Still a further object is to provide means of varying the second hitch whereby the width of cut made by the second binder is varied, or the second binder may be made to follow in the tracks of the first one as when leaving the field.

Still a further object is to provide the second hitch with means for cutting practically a full swath at a square corner in a field when turning either to the right or left.

Still a further object is to provide attaching means whereby my hitch is readily attached to a binder.

Still a further object is to arrange my hitch so that it can be adapted to a corn harvester and the tractor can be set over one row from the standing corn so as not to knock any of it down.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of a tractor and a first and second binder showing my hitch between the tractor and first binder and between the first and second binders.

Figure 2 is a detail sectional view on the line 2—2 of Figure 1.

Figure 3 is a detail sectional view on the line 3—3 of Figure 1.

Figure 4 illustrates the parts of the second binder hitch in a different position as when turning to the right; and Figure 5 shows the parts of the second binder hitch in a different adjusted position.

On the accompanying drawing, I have used the reference numeral 10 to indicate generally a tractor. The tractor 10 is provided with the usual draw bar 12. A grain binder A is illustrated as hitched to the tractor and a second binder B is illustrated as hitched to the first binder. The tractor and the binders form no part of the invention and the binders are of the usual make having a sickle bar 14, lateral conveyor 16, elevating conveyor 18, bundle platform 20 and bundle carrier 22. The grain wheel is illustrated at 24 of the bull wheel at 26.

The usual binder is also provided with a stub tongue 28 and steerable front wheels 30. My hitch whereby I draw the binder A behind the tractor 10 comprises a frame member 32 pivoted on the pivot rod 33 of the front wheels 30 and extending laterally from the stub tongue 28. A brace 34 is provided for preventing undue up and down movement of the outer end of the frame member 22, which is positioned low to prevent downward pressure on the front wheels when my hitch is used. A second brace 36 is provided to prevent pivotal movement of the frame member 32 about the pivot rod 33 of the front wheels. This provides a pivot connection 38 spaced laterally from the stub tongue 28 and held stationary relative thereto. This same structure is applied to the stub tongue of the binder B.

A draw bar 40 connects the pivot connection 38 of the binder A to the draw bar 12 of the tractor. The usual binder is provided with a pair of ears 42 and I pivotally mount between these ears a steering arm 44. I provide a link 46 for connecting the forward end of the steering arm 44 to the draw bar 40.

From the foregoing it is apparent that I have provided a draw bar 40 for connecting the binder A to the tractor 10 in such a manner that the tractor 10 is set out of line with the stub tongue 28 and yet there is little tendency for side draft because of pulling in a straight line on the connection 38. The link 46 provides a means for steering the front wheels 30 of the binder A when any pivotal movement is imparted to the draw bar 40 due to changing the course of the tractor 10.

In designing the second hitch, it is desirable to offset the binder B from the binder A whereby the binder B will cut a swath of grain next to that cut by the binder A. The binder A has cut the grain to the indicated line 48 and the binder B cuts a swath to the indicated line 50.

I have provided a draw bar 52 connected to the pivot connection 38 of the binder B for drawing the binder B behind the binder A. On the framework 54 of the binder A I mount a draw bar frame comprising rearwardly extending members 56 and a laterally extending bar 58. This frame is braced by suitable bracing 60 for holding it in proper alignment and is secured to the frame 54 of the binder A in the manner illustrated in Figure 3 and is clamped thereto by the bolts 62. Clevises 64 and 66 provide a flexible connection between the draw bar 52 and the laterally extending bar 58 of the draw bar frame.

A steering arm 44 is also provided for steering the front wheels 30 of the binder B which arm is connected by a link 68 to the draw bar 52 whereby any pivotal movement of the draw bar 52 will impart steering movement to said wheels. Another essential part of the second hitch is a chain 70 extending from the laterally extending bar 58 of the draw bar frame to the point of connection 72 between the draw bar 52 and the link 68.

It will be noted by referring to Figure 1 that the draw bar 52 is at an angle relative to the stub tongue 28 of the binder B and this, together with the flexible connection 64 and 66 and the chain 70, forms a very important part of my invention in order to accomplish the objects contemplated.

When the two binders are being drawn forward in a straight line, the chain 70 exerts the greatest pulling force on the binder B and the draw bar 52 together with the flexible connection consisting of the clevises 64 and 66 pulls in part, the load of the second binder. The chain 70 and the draw bar and its flexible connection will remain taut and the binder B will be drawn straight ahead.

In steering to the left, the hitches are indicated in dotted lines in Figure 1. It will be obvious that steering to the right would show the parts of the first binder in reversed position. In steering to the left, the second binder hitch would assume the dotted line position indicated. It will be noted that the bar 58 has been turned to a considerable angle but due to the slanting position of the draw bar 52, the front wheels 30 of the binder B are not turned as much as the draw bar itself and the binder B therefore cuts a full swath behind the binder A. In this position, the chain 70 hangs loosely. In turning to the right, the draw bar frame on the binder A would assume the position shown in Figure 4 and the chain 70 would draw the entire load of the binder B with the draw bar 52 swinging to the left relative to the link 68 and the clevises 64 and 66 against the bar 58 as illustrated. By this arrangement, the front wheels of the binder B are not turned as quickly as would be the case without the chain and flexible connection and the binder B therefore turns a comparatively square corner and cuts a full swath of grain when turning to the right. If found desirable, the second binder can be adjusted to cut less than a full swath of grain and this is accomplished by adjusting the connection 72 to a different hole 74 of the link 68. In making this adjustment, the chain 70 is also lengthened out so that the binder B will travel in a line to the right of the one shown in Figure 1.

When using this adjustment, the grain line 48 of the binder A will assume the position indicated in Figure 5, whereby less than a full cut is made by the binder B. It will be obvious that my device can be used on binders of various makes as well as corn husking and binding machines by adapting the attaching parts to fit the particular type of machine to which it is applied without departing from the essential details whereby the tractor is offset from the harvesting machine and steering movement is imparted to the steering wheels. This is desirable in corn picking machines in order to set the tractor over so that it will not interfere with standing corn.

In case the pivot connection 38 is desired on the left side of the stub tongue, the hitch can merely be turned over and still accomplish its purpose. Corn binders are usually made so that this would have to be done.

From the foregoing, it will be seen that I have provided a hitch for binders without a tendency to cause side draft and which can satisfactorily draw one binder behind the other without leaving standing grain at the corners of the field.

In the draw bar 52 I provide a hole 53 and the connection 72 of the link 68 to the bar 52 can be changed to the hole 53 whereby the binder B follows in the tracks of the binder A as illustrated in dotted lines in Figure 5. This is desirable in transferring the binders from field to field, etc., when they must be taken through gates which are not wide enough to accommodate them when they are offset from each other.

Some changes may be made in the details of the structure of my improved binder hitch without departing from the real spirit and purpose of my invention, and it is my intention to cover by my claims, any modified forms of structure or use of mechanical equivalents, which may be reasonably included within the scope of such claims and of my real invention.

I claim as my invention:

1. In combination with a pulling means and a device to be pulled having steerable wheels and a stub tongue for steering them, a hitch comprising a draw bar pivoted to said device at a point spaced from the pivotal point of the steerable wheels, connecting means for connecting the draw bar to the stub tongue for imparting steering movement to the steerable wheels when the draw bar is given pivotal movement, the free end of said draw bar being connected to said pulling means and a flexible pulling connection from the pulling means to the point of connection of the connecting means to the stub tongue.

2. In combination with a pulling means and a device to be pulled having steerable wheels and a stub tongue for steering them, a hitch comprising a draw bar pivoted to said device at a point spaced from the pivotal point of the steerable wheels connecting means for connecting the draw bar to the stub tongue for imparting steering movement to the steerable wheels when the draw bar is given pivotal movement, the free end of said draw bar being connected to said pulling means by a flexible connection and a flexible pulling connection from the pulling means to the point of connection of the connecting means to the stub tongue.

3. In combination with a harvester having a stub tongue supported on steerable wheels and pulling means for said harvester, a hitch comprising a pivot connection mounted stationary relative to said tongue and spaced on one side thereof, a draw bar connected to said pivot connection and to said pulling means, a steering arm for said wheels, a link connecting the free end of said steering arm to said draw bar for imparting steering movement to said wheels when said draw bar is caused to pivot about said pivot connection, a flexible connection between the connection of said link to said draw bar and a point on said pulling means space from the connection of the draw bar thereto.

4. In combination with a harvester having a stub tongue supported on steerable wheels and pulling means for said harvester, a hitch comprising a pivot connection mounted stationary relative to said tongue and spaced on one side thereof, a draw bar connected to said pivot connection and by flexible means to said pulling means, a steering arm for said wheels, a link connecting the free end of said steering arm to said draw bar for imparting steering movement to said wheels when said draw bar is caused to pivot about said pivot connection, a flexible connection between the connection of said link to said draw bar and a point on said pulling means spaced from the connection of the draw bar thereto.

5. In combination with a harvester having a stub tongue supported on steerable wheels and pulling means for said harvester, a hitch comprising a pivot connection mounted stationary relative to said tongue and spaced on one side thereof, a draw bar connected to said pivot connection and by flexible means to said pulling means, said bar extending from said pivot connection to said pulling means at an angle relative to the harvester, a steering arm for said wheels, a link connecting the free end of said steering arm to said draw bar for imparting steering movement to said wheels when said draw bar is caused to pivot about said pivot connection, a flexible connection between the connection of said link to said draw bar and a point on said pulling means spaced from the connection of the draw bar thereto.

6. In combination with a harvester having a stub tongue supported on steerable wheels and pulling means for said harvester, a hitch comprising a pivot connection mounted stationary relative to said tongue and spaced on one side thereof, a draw bar frame connected to said pulling means, said draw bar frame being provided with a lateral extension, a draw bar connected to said pivot connection and extending at an angle therefrom and having a flexible connection to said draw bar frame, a steering arm for steering said wheels, a link connecting said steering arm to said draw bar for imparting steering movement to said wheels when pivotal movement of said draw bar occurs, flexible means for connecting the point of connection of said link and said draw bar to the lateral extension of the draw bar frame.

7. In combination with a harvester having a stub tongue supported on steerable wheels and pulling means for said harvester, a hitch comprising a frame member extending laterally from said tongue, a pivot connection at the outer end of said frame member, means for maintaining said pivot connection stationary relative to said tongue, a draw bar frame connected to said pulling means, said draw bar frame being provided with a lateral extension, a draw bar connected to said pivot connection and extending at an angle therefrom and having a flexible connection to said draw bar frame, a steering arm for steering said wheels, a link connecting said steering arm to said draw bar for imparting steering movement to said wheels when pivotal movement of said draw bar occurs; flexible means for connecting the point of connection of said link and said draw bar to the lateral extension of the draw bar frame.

8. In combination with a pulling means and a device to be pulled having steerable wheels and a pivotally mounted draw bar for steering them when the draw bar is given pivotal movement, the free end of said draw bar being connected to said pulling means by a flexible connection and a flexible pulling connection from the pulling means to a point on the draw bar spaced from its pivotal connection.

Des Moines, Iowa, August 21, 1926.

GUY A. TRAUGER.